United States Patent [19]

Chu et al.

[11] Patent Number: 4,865,735

[45] Date of Patent: Sep. 12, 1989

[54] AMINE CONTAINING POLYURETHANE COMPOSITIONS FOR SEPARATORY DEVICES

[75] Inventors: Yuan C. Chu, East Windsor; Melvin Brauer, East Brunswick, both of N.J.

[73] Assignee: CasChem, Inc., Bayonne, N.J.

[21] Appl. No.: 157,811

[22] Filed: Feb. 18, 1988

[51] Int. Cl.$^4$ .............................................. B01D 13/00
[52] U.S. Cl. ............................ 210/321.61; 210/500.23
[58] Field of Search ................... 210/321.61, 500.23, 210/321.8

[56] References Cited

U.S. PATENT DOCUMENTS

| | | | |
|---|---|---|---|
| 3,228,876 | 1/1966 | Mahon | 210/22 |
| 3,339,341 | 9/1967 | Maxwell et al. | 55/16 |
| 3,362,921 | 1/1968 | Ehrlich et al. | 260/18 |
| 3,483,150 | 12/1969 | Ehrlich et al. | 260/18 |
| 3,962,094 | 6/1976 | Davis et al. | 210/321 R |
| 4,170,559 | 10/1979 | Kroplinski et al. | 210/321 A |
| 4,224,164 | 9/1980 | Brauer et al. | 210/321 B |
| 4,267,044 | 5/1981 | Kroplinski | 210/321.2 |
| 4,359,359 | 11/1982 | Gerlach et al. | 210/321.61 X |
| 4,533,598 | 8/1985 | Downey et al. | 428/380 |
| 4,645,630 | 2/1987 | Rasshofer et al. | 264/50 X |

*Primary Examiner*—Frank Spear
*Attorney, Agent, or Firm*—Pennie & Edmonds

[57] ABSTRACT

Polyurethane compositions having improved adhesion comprising amine containing isocyante cured polyols of liquid esters of carboxylic acids having at least 8 carbon atoms for use as potting compounds or sealants for hollow fiber or folded membrane biomedical separatory devices, especially when such device contain contaminants such as glycerine or water.

26 Claims, No Drawings

AMINE CONTAINING POLYURETHANE COMPOSITIONS FOR SEPARATORY DEVICES

TECHNICAL FIELD

The invention relates to amine containing polyurethanes which are useful as potting and sealing compounds for biomedical devices, particularly for applications where significant amounts of glycerine or water are encountered during the manufacture of such devices or wherein specialty plastics such as polysulfone or polyacrylonitrile are used in such separatory devices.

BACKGROUND ART

In the past, polyurethane compositions based on an isocyanate-terminated prepolymer comprising the reaction product of a polyol and a polyisocyanate cured with one or more polyfunctional crosslinking agents have been described in the art. Of particular concern herein are polyurethanes based on prepolymers comprising the reaction product of long chain hydroxyl-bearing fatty acid esters such as castor oil with organic polyisocyanates, since such compositions are useful in the manufacture of separatory devices for biomedical purposes.

For example, in U.S. Pat. No. 3,362,921 to Ehrlich et al, curing agents for prepolymers based on the reaction product of active hydrogen-containing compounds such as castor oil, polyester amides and polyalkylene ether glycols with organic diisocyanates are described. These agents are esters of polyhydric alcohols containing at least four hydroxy groups and an aliphatic acid having at least 12 carbon atoms and one or more hydroxy and/or epoxy groups. The cured polyurethanes find use as flocking adhesives, paper coatings, potting compositions and encapsulating compounds for electronic parts.

U.S. Pat. No. 3,483,150 to Ehrlich et al. discloses prepolymer compositions which are the reaction product of at least one polyfunctional compound containing active hydrogens with an arylene diisocyanate and a low viscosity or solid polyfunctional isocyanate derived from the reaction of aniline and formaldehyde and having a functionality of 2 or greater, preferably between 2 and 3. The prepolymers are cured to elastomers by adding to the prepolymer at least one curing agent comprising a material containing two or more active hydrogen groups. Such curing agents include the curing agent of U.S. Pat. No. 3,362,921 and in addition, a glycol, glycerol, polyglycol, or polyalkylene glycol mono- or diester of a hydroxy carboxylic acid having at least 12 carbon atoms. Certain amines are useful in curing the prepolymers and include primary and secondary aliphatic, cyclic, aromatic, aralkyl and alkaryl diamines.

In U.S. Pat. No. 3,962,094 to Davis, a hollow fiber separatory device useful for dialysis, ultra-filtration, reverse osmosis, hemodialysis, etc., is provided. This device consists of a plurality of fine, hollow fibers whose end portions are potted in a tube sheet and whose open fiber ends terminate in a tube sheet face which provides liquid access to the interior of the fibers. The tube sheet comprises a cured polyurethane consisting essentially of a prepolymer based on the reaction product of castor oil with at least one mole per castor oil hydroxy group of an organic diisocyanate and cross-linked with either castor oil or an ester of a polyhydric alcohol having a hydroxyl functionality of 4 or more and an organic acid containing at least 12 carbon atoms and one or more hydroxy and/or epoxy groups per molecule, or mixtures of castor oil and such esters.

Patents representative of the art of hollow fiber separatory devices include U.S. Pat. Nos. 2,972,349; 3,228,876; 3,228,877; 3,339,341; 3,442,088; 3,423,491; 3,503,515; and 3,551,331; the disclosures of which are incorporated herein by reference.

The sealing collar is typically derived from a resin which is capable of encapsulating the fibers to provide a seal which prevents the fluid inside the hollow fibers from mixing with the fluid outside the fibers.

A preferred class of resins useful for preparing the sealing collars are flexible polyurethane forming systems as illustrated by U.S. Pat. Nos. 3,362,921; 3,708,071; 3,722,695; 3,962,094; 4,031,012; 4,256,617; 4,284,506; 4,332,927 and Re. 31,389. Centrifugal casting, as illustrated by U.S. Pat. No. 3,492,698, is a representative method employed for preparing sealing collars. In accordance with such a technique, a holding device containing a bundle of fibers arranged in a parallel configuration is placed into a centrifugal-like device which incorporates a potting material reservoir with tubes connecting it to end-molds. An appropriate resin is placed into the potting reservoir and maintained at an appropriate temperature. The entire assembly is then rotated to force the resin down the connecting tubes by the centrifugal force. The resin thereby flows around and among the fibers in the end-molds. The rotation is continued until the resin gels. When polyurethanes are employed in the resin, typical residence time in the centrifuge can vary almost 1 to about 2 hours at room temperature. When rotation is completed the resin impregnated fiber bundle is removed and post-cured. The end molds are then removed and the fiber ends are opened by cutting through the resin collar perpendicular to the fiber bundle.

Other sealing collar forming techniques rely on the force of gravity to force the resin into a mold containing the ends of the hollows fibers. The resin is allowed to gel and then is post-cured.

Regardless of the particular method employed for preparing the sealing collar, the polyurethanes typically employed therein exhibit extended gel and demold times.

In addition to hollow fiber separatory devices, folded membrane separatory devices have also been used in chemical separations such as dialysis, osmotic processes and hemodialysis. In a folded membrane artificial kidney, for example, a membrane sheet is multiply-folded or pleated to form a series of adjacent channels with each channel located between opposing faces of each fold. The edges of the folds in the membrane are sealed together by potting the edges in a sealant. The membrane is then placed in a case usually comprised of polystyrene, a styrene-acrylonitrile copolymer or a polycarbonate polymer wherein the chemical separation takes place. In the case of dialysis, the dialysis solution is placed on one side of the membrane and blood is placed on the other side. Polyepoxides and polyurethanes have generally been used to seal the edges of folded membranes. U.S. Pat. No. 4,267,044 provides a thixotropic polyurethane composition which is particularly useful for sealing such folded membrane devices.

Many potting systems have been applied to biomedical separatory devices, however, they exhibit limited success. Among the resins used in these potting compounds are polyolefins, wax-extended polyolefins, polyolefin copolymers, polyamides, polystyrene, polyvinyl chloride, silicone rubbers, epoxy resins and the like.

The polyurethane systems of the prior art which have been used to pot the ends of hollow fiber or folded membrane separatory devices also have various limitations. For example, the fibers have to be dried prior to potting, otherwise, residual moisture will cause bubbling in the composition when contacting the polyurethane mixture prior to curing. The drying process is costly and in some cases not possible, for example, with fibers requiring large amount of glycerine to sustain pore openings. In addition to the significant amount of moisture or water which exists in these devices, the glycerine interferes with the reaction between isocyanates and polyols. Thus, the polyurethane systems of the prior art are not suitable for fibers containing significant amounts of moisture or glycerine.

Another problem has been encountered with the adhesive capability of prior art compositions. They are satisfactory for dry cellulosic fibers but fail to provide sufficient adhesion to modern specialty fiber materials, such as polysulfone and polyacrylonitrile (PAN).

The present invention overcomes the limitations on the state of the art polyurethanes, providing compositions that have performance substantially unaltered by the presence of moisture or glycerine, as well as improved adhesion to specialty plastic materials.

SUMMARY OF THE INVENTION

The invention relates to biomedical separatory devices of hollow fiber or folded membrane construction, the ends of which are potted with a cured polyurethane composition of a polyol of a liquid ester of carboxylic acid having at least 8 carbon atoms, a polyisocyanate compound and an amine compound having an equivalent weight of between 30 and 4000 in an amount sufficient to impart to the polyurethane improved adhesion to hollow fibers or semi-permeable membranes. Generally, the amine constitutes between about 0.2 and 16 percent (by equivalents) of the overall polyurethane composition.

DETAILED DESCRIPTION OF THE PREFERRED EMBODIMENTS

The polyols which may be used in the compositions of this invention include esters of carboxylic acids having at least 8 carbon atoms, such esters being liquid at ambient temperature and having a hydroxyl functionality of at least 2. To obtain desirable esters, the carboxylic acid generally contains less than about 25 carbon atoms and preferably between 12 and 20. Hydroxyl functionality as used herein is the average number of hydroxyl groups per molecule of ester compound.

The most preferred polyols are esters of nicinoleic acid with polyhydric alcohols, which form ricinoleate esters. Such compounds include various mono and polyricinoleate compounds and mixtures thereof.

These esters are preferably ricinoleic acid polyol esters and more preferably castor oil, a naturally occurring triglyceride of ricinoleic acid. Castor oil is actually a mixture of mono-, di-, and triglycerides and has an average hydroxyl functionality of 2.7. Other ricinoleic acid polyol esters include glycol, polyglycol and other polyhydric alcohol mono-, di-, and polyesters of ricinoleic acid. These ricinoleic acid polyol esters can be made by methods well known in the art, e.g., by direct esterification of ricinoleic acid with alcohols such as ethylene glycol, glycerine, propylene glycol, hexylene glycol, diethylene glycol, dipropylene glycol, hexamethylene glycol, polyethylene and polypropylene glycols, sucrose or sorbitol.

Specific nicinoleate ester compounds includes ethylene glycol mono- and di-ricinoleate, penta erythritol mono-, di-, tri-, tetra- and penta- ricinoleates, glycerol ricinoleate, 1,4-cyclohexane dimethanol mono- and di-ricinoleates, butane diol diricinoleate, neopentyl glycol mono- and di-ricinoleates, and mono- or di-ricinoleates of N,N-bis (2-hydroxypropyl) aniline or $N,N,N^1,N^1$-tetrakis (2-hydroxypropyl) ethylene diamine.

For the polyol component, these esters can be used alone or in combination with up to 25% by weight of a polyether polyol.

The preferred polyether polyols are polyether diols, and more particularly polyoxypropylene diols. Generally, these polyether diols are prepared by condensing a large excess of an alkylene oxide, such as ethylene oxide or propylene oxide with a glycol, as is well known in the art. The glycol can be a diol such as alkylene glycols, e.g., ethylene glycol or propylene glycol, a triol such as glycerine, a tetrol such as pentaerythritol, etc.

The organic polyisocyanates which are suitable for this invention include any isocyanate or polyisocyanate compound, including mono or diisocyanates. Preferably, organic polyisocyantes having 2 or more NCO groups per molecule and no other substituents capable of reacting with the hydroxyl groups of the polyol are used. This would include aliphatic polyisocyanates, preferably diisocyanates, cycloaliphatic polyisocyanates, or aromatic polyisocyantes.

The diisocyanates which may be used in this invention include: the arylene diisocyanates, represented by the diisocyanates of the benzene and napthalene series, or mixtures of these compounds. Illustrative of such arylene diisocyanates include: toluene diisocyanate (2,4/2,6); toluene 2,4- diisocyanate; toluene 2, 6- diisocyanate; m-phenylene diisocyanate, xenylene 4,4- diisocyanate; napthalene 1,5 diisocyanate; 3,3-bitolylene 4,4-diisocyanate; diphenylene methane 4,4,-diisocyanate (MDI); 4-chlorophenylene 2,4-diisocyanate; dianisidine diisocyanate, diphenylene ether 4,4,-diisocyanate, and polymeric isocyanates such as polymethylene polyphenylene isocyanate. Other arylene diisocyanates which are useful include lower alkyl and alkoxy-substituted derivatives. Aliphatic and cycloaliphatic diisocyanates, such as isophone diisocyanate (IPDI), can be employed. Mixtures of arylene and aliphatic or cycloaliphatic diisocyanates can be used in compositions of this invention. Isocyanate adducts such as modified MDI, trimers, TMP-TDI adducts and biurets of hexamethylene diisocyanate can also be used, if desired.

Amines suitable for the invention include monoamines, polyamines, or mixtures thereof having an equivalent weight of 30 to 4000. If desired, the amine can be prereacted with the above isocyanate as part of the isocyante portion. The amine should comprise 0.2–16% by equivalents of the finished composition depending upon the nature of the amine and specific isocyanate compound utilized.

The amount of organic polyisocyanate compound to be reacted with the amine should be sufficient to provide between 1 and 1.4 mole, and preferably between about 1 and 1.1 mole, of diisocyanate per amino group of polyamine. For prepolymer formation, an NCO/NRH ratio of above about 2:1 and preferably about 3:1 and up to about 7:1 or more is desirable. The most preferred range is between about 4:1 and 5:1 to insure the formation of an isocyanate-terminated prepolymer which is capable of further reaction with the nolyol component.

As noted above, the amine component should not exceed 16% by equivalents of the overall composition, and is substituted for a portion of the polyol component for reaction with the isocyanate compound to form the novel polyurethanes described herein. As is well known by one skilled in the art, equivalents for each component in the composition can be calculated by determining the actual weight (in parts) of each component, and by dividing this weight by the equivalent weight of the component, to determine the amount of equivalents for each component. Then, the amount of equivalents for the amine component, divided by the total amount of equivalents for all components, (then multiplied by 100%) provides the equivalents percent of amine in the compositions.

EXAMPLES

The scope of the invention is further described in connection with the following examples which are set forth for the sole purpose of illustrating the preferred embodiments of the invention and which are not to be construed as limiting the scope of the invention in any manner. In these examples, all parts given are by weight unless otherwise specified.

The specific formulations appears in Tables 1 and 2, while the performance characteristics of adhesion and flexibility as a function of mix ratio, amine eq. % etc. were evaluated, and are presented in Table 3. The method of evaluation is as follows: The potted section is examined visually using a microscope if necessary. Following criteria are used to determine the quality of the polyurethane potting compounds.

Flexibility — The cut slices are gently flexed repeatedly by hand until the slices break. This breakage usually occurs along the boundary of the polyurethane fibers. If the slice breaks apart after flexing more than twice, it is classified as borderline, (designated in the tables as "some"). If the slice breaks during the first flexing, its flexibility rating is poor. If it tolerates more than five flexings, the flexibility rating is good, while if it tolerates more than 10 flexings, the flexibility rating is excellent.

Adhesion to Fiber — No fiber should be disbonded from the polyurethane in actual applications. Thus, the cut slices are torn apart intentionally to determine where breakage occurs. If the slice breaks apart within the polyurethane area, the adhesion rating is excellent. If the slice breaks apart along the boundary of polyurethane and fibers and within the polyurethane area with somewhat resistance to the applied force, the adhesion rating is good. If the slice breaks apart along the boundary of the polyurethane and fibers with some resistance thereto, the rating is "some" adhesion. If the slice breaks apart easily, along the boundary of the polyurethane fibers, the adhesion rating is poor. If fibers separate from the polyurethane easily by hand, the adhesion rating is poor even if the splice itself is difficult to break.

Overall Ratings — 3 is assigned if a polyurethane compound exhibits good to excellent flexibility, with good to excellent adhesion. 2 is assigned if the flexibility is borderline with at least "some" adhesion. 1 is assigned if the flexibility and/or the adhesion are poor. 2 and 3 indicate formulations which provide acceptable performance.

EXAMPLE I

A prepolymer was prepared as follows.

70 parts Desmodur W (hydrogenated MDI) was gradually added to 30 parts Duomeen O (N-oleyl-1,3 diamino propane) at a temperature of 35° C.

After addition, the temperature was raised to between 60 and 70° C. in order to complete the reaction.

50 parts of this prepolymer was then reacted with 50 parts polyol G of Table 2. The mixture was quickly degassed and then used as a potting compound.

A hollow fiber biomedical separatory device having hollow fibers containing large amounts of glycerin was potted with this polyurethane composition. Potting is accomplished by a centrifugal casting technique as described in U.S. Pat. Nos. 3,228,876 and 3,962,094. The potted area was cut into slices at right angles to reveal the open ends of the fiber tubes. These slices were then immersed into water for 1 minute. The appearance of the slice was then examined by microscope for contact of the potting compound to the hollow fibers and for retention of the fiber geometry. No whitening of the composition due to the absorption of water was found. Furthermore, the polyurethane of this example provided excellent fiber contact and geometric retention without significant volume or strength changes.

For illustration purposes, a sample calculation for the amine component is conducted for this Example 1. 30 parts Duomeen O were used in the prepolymer, and 50 parts of the prepolymer were used to react with polyol G (Table 2). Accordingly, there were effectively 15 parts Duomeen O in the overall composition. Since the equivalent weight of the Duomeen O is 180, 0.0833 equivalents of the Duomeen O were present. The total amount of equivalents for all components is 0.5220, and the Duomeen O represents 16% by equivalents of the overall composition (0.0833/.522×100%). The specific calculations appear below in Table A.

TABLE A

| Component | Wt (parts) | Proportion in mix | Wt in Mix (parts) | Eq. Wt. | Equivs. |
|---|---|---|---|---|---|
| Desmodur W | 70 | .5 | 35 | 131 | 0.2671 |
| Duomeen O | 30 | .5 | 15 | 180 | 0.0833 |
| Caspol 1842 | 26 | .5 | 13 | 360 | 0.0361 |
| Polycin-12 | 18.5 | .5 | 9.25 | 170 | 0.0544 |
| Castor Oi | 55.5 | .5 | 27.75 | 342 | 0.0811 |
| | | | | | 0.5220 |

These specific components are identified below Tables 1 and 2.

The isocyanate component generally represents about half of the equivalent weight of the composition. However, especially preferred equivalent percentages for each component are as follows:

| amine | 0.2 to 16% |
|---|---|
| isocyanate | 40 to 64% |
| polyol | 20 to 60% |

EXAMPLES 2–9

Various reactions were carried out utilizing prepolymer compositions A-C and E (Table 1) and polyol compositions G-K (Table 2) as in Example 1. These compositions were used to pot separatory devices in the same manner described in Example 1. Results are shown in Table 3.

TABLE 1

| ISOCYANATE COMPOUNDS OR PREPOLYMERS | | | | | | |
|---|---|---|---|---|---|---|
| | A | B | C | D | E | F |
| Desmodur W | 70 | 80 | 80 | 100 | 55 | |
| Desmodur N3200 | | | | | 28 | |
| Duomeen O | 30 | 20 | 156 | | 17 | |
| Mobay XP-744 | | | | | | 100 |

Desmodur W is hydrogenated methylenediphenyldiisocyanate ("MDI")
Desmodur N—3200 is the biuret of hexamethylene diisocyanate.
Duomeen O is N—oleyl-1,3 diamino propane
Mobay XP-744 is a modified MDI product

TABLE 2

| | POLYOLS | | | | |
|---|---|---|---|---|---|
| | G | H | I | J | K |
| Caspol 1842 | 26 | | | | 26 |
| Polycin 12 | 18.5 | 6 | | 30 | 18.5 |
| Castor Oil | 55.5 | | | | 55.5 |
| Flexricin 13 | | | 95 | | |
| Hycar ATBN | | | 5 | | |
| Caspol 1881 | | 82 | | | |
| Campamid Z940 | | 12 | | | |
| Duomeen O | | | | | 10 |
| Flexricin 9 | | | | 70 | |
| c-1707, % | 0.4 | 0.2 | 0.4 | 0.7 | 0.2 |

Polycin 12 is pentaerythritol monoricinoleate
Flexricin 13 is glycerol ricinoleate
Flexricin 9 is propyl monoricinoleate
Campamid Z940 is imidazoline terminated product of a fatty acid with 2-hydroxy-ethylamino ethyl amine
C-1707 is dioctyl tin diricinoleate catalyst
Hycar ATBN is an amine terminated copolymer of butadiene and acrylonitrile
Caspol 1881 is pentaerythritol triricinoleate
Caspol 1842 is 1,4-cyclohexane-dimethanol diricinoleate

TABLE 3

| | POLYURETHANE SYSTEMS | | | | | | | | |
|---|---|---|---|---|---|---|---|---|---|
| Example | 1 | 2 | 3 | 4 | 5 | 6 | 7 | 8 | 9 |
| Prepolymer | A | B | C | D | D | D | E | F | F |
| Polyol | G | G | G | G | H | I | J | G | K |
| Mix Ratio | 50/50 | 45/56 | 40/60 | 33/67 | 33/67 | 45/55 | 54/46 | 44/56 | 42/58 |
| Amine eq. % | 16 | 10 | 7 | 0 | 7 | 0.2 | 8 | 0 | 7 |
| Adhesion | good | good | some | poor | excel. | some | good | poor | some |
| Flexibility | good | good | some | poor | excel. | some | good | poor | some |
| Overall performance | 3 | 3 | 2 | 1 | 3 | 2 | 3 | 1 | 2 |

3 excellent
2 marginal - but acceptable
1 poor - not acceptable
Note: formulations 4 and 8 are comparative Examples 1-3 illustrate that improvements in performance are obtained by the replacement of varying amounts of the hydroxyl component of the formulation by an amine. Example 4 is the control for these examples.

Example 5 illustrates that the amine can be utilized in the polyol to obtain this improvement.

Example 6 illustrates that even low amounts of amine produce an improvement in performance compared to formulation which do not include the amine (i.e., Examples 4 and 8). Example 7 illustrates that various aliphatic isocyanates can be used to prepare an improved casting system.

Example 8 illustrates that the substitution of an aromatic isocyanate for the aliphatic isocyanate of the preceding examples will not produce the improvement unless there is amine present in either the prepolymer or polyol formulation, as illustrated in Example 9.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. A hollow fiber separatory device capable of use in biomedical applications comprising a hollow fiber bundle consisting of a plurality of fine hollow fibers whose open fiber ends terminate in a tube-sheet face, the resulting bundle being sealed within a casing to form a separatory cell having two or more fluid ports which allow for the passage of one fluid through the fibers and another around the fibers without mixing of the two fluids, said tube-sheet comprising a cured polyurethane composition comprising the reaction product of an organic isocyanate, a polyol of a liquid ester of a carboxylic acid having at least 8 carbon atoms, and an amine compound having an equivalent weight between 30 and 4000 in an amount sufficient to impart to the polyurethane improved adhesion to said hollow fibers.

2. The device of claim 1 wherein the amount of the amine compound comprises 0.2-16% by equivalents of the overall composition.

3. The device of claim 1 wherein the polyol is an ester of ricinoleic acid and a polyhydric alcohol.

4. The device of claim 1 wherein the polyol further comprises up to about 25 percent by weight of a polyether polyol.

5. The device of claim 1 wherein a portion of the amine and a portion of the polyisocyanate are reacted to form a prepolymer.

6. The device of claim 1, wherein a portion of the polyol and a portion of the polyisocyanate are reacted to form a prepolymer.

7. The composition of claim 1 wherein the organic polyisocyanate is present in substantially stoichiometric amounts i relation to the polyol and amine components.

8. The device of claim 1, wherein the amine compound is an aliphatic or aromatic polyamine.

9. A biomedical separatory device comprising semipermeable membrane separating means whose extremities are potted in holding means, the resulting separating means being sealed by the holding means to a casing to form a separatory cell having two or more fluid ports which allow passage of one fluid on one side of the separating means and another fluid on the other side of said separating means without mixing of the two fluids, said holding means comprising a cured polyurethane composition comprising the reaction product of an organic isocyanate, a polyol of a liquid ester of a carboxylic acid having at least 8 carbon atoms, and an amine compound having an equivalent weight between 30 and 4000 in an amount sufficient to impart to the polyurethane improved adhesion to said membrane means.

10. The device of claim 9 wherein the amount of the amine compound comprises 0.2–16% by equivalents of the overall composition.

11. The device of claim 9 wherein the polyol is an ester of ricinoleic acid and a polyhydric alcohol.

12. The device of claim 9 wherein the polyol further comprises up to about 25 percent by weight of a polyether polyol.

13. The device of claim 9 wherein a portion of the amine and a portion of the polyisocyanate are reacted to form a prepolymer.

14. The device of claim 9 wherein a portion of the polyol and a portion of the polyisocyanate are reacted to form a prepolymer.

15. The device of claim 9 wherein the organic polyisocyanate is present in substantially stoichiometric amounts in relation to the polyol and polyamine components.

16. The device of claim 9 wherein the amine compound is an aliphatic or aromatic polyamine.

17. A process for preparing a separatory device for use in a biomedical application by securing a portion of at least one separatory means in a housing using a cured polyurethane composition provided by reacting a first component comprising at least one organic polyisocyanate compound with a second component comprising at least one polyol of a liquid ester of a carboxylic acid having at least 8 carbon atoms, which process comprises mixing with either of said first or second components from 0.2 to 16 percent by equivalents of an amine compound having an equivalent weight between about 30 and 4000 and reacting the components to form a cured polyurethane having improved adhesion for securing a portion of said separatory means to said housing.

18. The process of claim 17 wherein the separatory means is selected from one of hollow fibers or semipermeable membranes.

19. The process of claim 17 which further comprises potting the ends of said separatory means with said polyurethane composition.

20. The process of claim 17 wherein the organic polyisocyanate is present in substantially stoichiometric amounts in relation to the polyol and amine components.

21. The process of claim 17 which further comprises forming a prepolymer from a portion of the amine and a portion of the polyisocyanate prior to the reaction of the components.

22. The process of claim 17 which further comprises forming a prepolymer from a portion of the polyol and a portion of the polyisocyanate prior to the reaction of the components.

23. The process of claim 17 wherein the polyol is an ester of ricinoleic acid and a polyhydric alcohol.

24. The process of claim 17 wherein the polyol is a ricinoleate containing compound.

25. The process of claim 17 which further comprises adding to said polyol components prior to reaction with said amine and isocyanate components, up to 25 percent by weight, based on the weight of the polyol, of a polyether polyol.

26. A separatory device capable use in a biomedical application comprising separatory means secured within a housing by a cured polyurethane composition to form a separatory cell having two or more fluid ports which allow for the passage of two fluids through the device without mixing thereof, said cured polyurethane composition consisting essentially of the reaction product of from about 40 to 64 percent by equivalents of an organic isocyanate, from 20 to 60 percent by equivalents of a polyol of a liquid ester of a carboxylic acid, and from about 0.2 to 16 percent by equivalents of an amine compound having an equivalent weight of between 30 to 4000 which imparts to the composition improved adhesion properties.

* * * * *